(12) United States Patent
Tomokiyo et al.

(10) Patent No.: US 10,120,465 B2
(45) Date of Patent: Nov. 6, 2018

(54) INFORMATION PROCESSING APPARATUS, INFORMATION PROCESSING METHOD, AND PROGRAM

(71) Applicant: SONY CORPORATION, Tokyo (JP)

(72) Inventors: Tsutomu Tomokiyo, Kanagawa (JP); Hiroyuki Kaneko, Tokyo (JP)

(73) Assignee: LINFINY CORPORATION, Taoyuan (TW)

( * ) Notice: Subject to any disclaimer, the term of this patent is extended or adjusted under 35 U.S.C. 154(b) by 0 days.

(21) Appl. No.: 15/308,402

(22) PCT Filed: Feb. 19, 2015

(86) PCT No.: PCT/JP2015/054649
§ 371 (c)(1),
(2) Date: Nov. 2, 2016

(87) PCT Pub. No.: WO2015/174111
PCT Pub. Date: Nov. 19, 2015

(65) Prior Publication Data
US 2017/0068331 A1 Mar. 9, 2017

(30) Foreign Application Priority Data
May 14, 2014 (JP) ................................. 2014-100646

(51) Int. Cl.
*G06F 3/038* (2013.01)
*G06F 3/0488* (2013.01)
(Continued)

(52) U.S. Cl.
CPC .......... *G06F 3/038* (2013.01); *G06F 3/03545* (2013.01); *G06F 3/041* (2013.01);
(Continued)

(58) Field of Classification Search
CPC ...... G06F 3/038; G06F 3/03545; G06F 3/041; G06F 3/0416; G06F 3/048; G06F 3/0488;
(Continued)

(56) References Cited

U.S. PATENT DOCUMENTS 7,605,899 B2   10/2009   Shikina et al.
8,390,578 B2   3/2013   Chino
(Continued)

FOREIGN PATENT DOCUMENTS

JP   2005-189851 A   7/2005
JP   2009-193482 A   8/2009
(Continued)

OTHER PUBLICATIONS

International Search Report and Written Opinion of PCT Application No. PCT/JP2015/054649, dated May 12, 2015, 7 pages of English Translation and 7 pages of ISRWO.

(Continued)

*Primary Examiner* — Tom Sheng
(74) *Attorney, Agent, or Firm* — Chip Law Group

(57) ABSTRACT

[Object] To propose an information processing apparatus, an information processing method, and a program, which are capable of preventing deterioration in responsiveness of handwriting input.
[Solution] Provided is an information processing apparatus including: an acquisition unit configured to acquire a detection result from a detector that detects proximity of an operating object to an operation subject; and a display controller configured to, in a case where the display controller recognizes that a distance between the operation subject and the operating object, which are spaced apart from each other, exceeds a threshold on the basis of the detection result, cause a display to display an image in a (Continued)

display mode different from a display mode used in a case where the distance is less than or equal to the threshold.

14 Claims, 6 Drawing Sheets

(51) Int. Cl.
    *G06F 3/041*     (2006.01)
    *G06F 3/048*     (2013.01)
    *G06F 3/0354*     (2013.01)
    *G09G 5/00*     (2006.01)
    *G09G 5/24*     (2006.01)

(52) U.S. Cl.
    CPC ............ *G06F 3/048* (2013.01); *G06F 3/0416* (2013.01); *G06F 3/0488* (2013.01); *G06F 3/04883* (2013.01); *G09G 5/003* (2013.01); *G09G 5/24* (2013.01); *G06F 2203/04108* (2013.01); *G09G 2354/00* (2013.01)

(58) Field of Classification Search
    CPC ....... G06F 3/04883; G06F 2203/04103; G06F 2203/04108; G09G 5/003; G09G 5/24; G09G 2354/00
    See application file for complete search history.

(56) References Cited

U.S. PATENT DOCUMENTS

| | | |
|---|---|---|
| 2007/0133080 A1 | 6/2007 | Shikina et al. |
| 2009/0207154 A1 | 8/2009 | Chino |
| 2010/0302205 A1* | 12/2010 | Noma ................ G06F 3/041 345/174 |
| 2012/0320198 A1* | 12/2012 | Yasutake ............. G06F 3/005 348/143 |
| 2013/0063492 A1* | 3/2013 | Washington ........... G09G 5/003 345/660 |
| 2013/0093664 A1* | 4/2013 | Nishidate ............ G06F 3/04883 345/156 |
| 2013/0268847 A1* | 10/2013 | Kim .................. G06F 3/0488 715/251 |
| 2014/0123079 A1 | 5/2014 | Wu |
| 2015/0205943 A1* | 7/2015 | Takenaka ............ G06F 3/04883 726/17 |
| 2015/0277841 A1* | 10/2015 | Lanier .................. G06F 3/014 345/428 |

FOREIGN PATENT DOCUMENTS

| | | |
|---|---|---|
| JP | 2011-180789 A | 9/2011 |
| JP | 4770844 B2 | 9/2011 |
| KR | 10-2009-0089254 A | 8/2009 |
| TW | 200943147 A | 10/2009 |
| WO | 2005/055187 A1 | 6/2005 |
| WO | 2005055187 A1 | 6/2005 |

OTHER PUBLICATIONS

International Preliminary Report on Patentability of PCT Application No. PCT/JP2015/054649, dated Nov. 15, 2016, pp. 5.

Extended European Search Report for EP Patent Application No. 15792986.0, dated Nov. 15, 2017, 8 pages.

* cited by examiner

INFORMATION PROCESSING APPARATUS, INFORMATION PROCESSING METHOD, AND PROGRAM

CROSS REFERENCE TO RELATED APPLICATIONS

This application is a U.S. National Phase of International Patent Application No. PCT/JP2015/054649 filed on Feb. 19, 2015, which claims priority benefit of Japanese Patent Application No. JP 2014-100646 filed in the Japan Patent Office on May 14, 2014. Each of the above-referenced applications is hereby incorporated herein by reference in its entirety.

TECHNICAL FIELD

The present invention relates to an information processing apparatus, an information processing method, and a program.

BACKGROUND ART

Apparatuses are known, each of which are capable of accepting handwriting input on a screen by causing an operating object such as a stick-shaped member including a stylus or a finger to touch the screen. As a screen for such a terminal, there has been given so-called electronic paper to which a bistable display (for example, bistable electro-optical display) is applied.

CITATION LIST

Patent Literature

Patent Literature 1: JP 2013-239019A

SUMMARY OF INVENTION

Technical Problem

On the other hand, with increase in a bit depth for displaying an image, the bistable display tends to take longer time for displaying the image on the display. Accordingly, among the apparatuses to which bistable displays are applied, there are some apparatuses in which responsiveness is improved by temporarily changing a display mode, for example, decreasing the bit depth for displaying the image (for example, displaying binary black and white image) in the case where faster response is required as in the case of performing handwriting input.

However, in the case where a configuration of temporarily changing a display mode is taken, processing of redisplaying the image in an original display mode and drawing processing based on user's handwriting input may compete with each other, and the competition of the processing may deteriorate the improved responsiveness of the handwriting input.

Accordingly, the present disclosure proposes an information processing apparatus, an information processing method, and a program, which are capable of preventing deterioration in responsiveness of handwriting input.

Solution to Problem

According to the present disclosure, there is provided an information processing apparatus including: an acquisition unit configured to acquire a detection result from a detector that detects proximity of an operating object to an operation subject; and a display controller configured to, in a case where the display controller recognizes that a distance between the operation subject and the operating object, which are spaced apart from each other, exceeds a threshold on the basis of the detection result, cause a display to display an image in a display mode different from a display mode used in a case where the distance is less than or equal to the threshold.

According to the present disclosure, there is provided an information processing method including: acquiring a detection result from a detector that detects proximity of an operating object to an operation subject; and causing, by a processor, in a case where the display controller recognizes that a distance between the operation subject and the operating object, which are spaced apart from each other, exceeds a threshold on the basis of the detection result, a display to display an image in a display mode different from a display mode used in a case where the distance is less than or equal to the threshold.

According to the present disclosure, there is provided a program for causing a computer to execute: acquiring a detection result from a detector that detects proximity of an operating object to an operation subject; and causing, in a case where the display controller recognizes that a distance between the operation subject and the operating object, which are spaced apart from each other, exceeds a threshold on the basis of the detection result, a display to display an image in a display mode different from a display mode used in a case where the distance is less than or equal to the threshold.

Advantageous Effects of Invention

As described above, according to the present disclosure, there is provided the information processing apparatus, the information processing method, and the program, which are capable of preventing deterioration in responsiveness of handwriting input.

Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
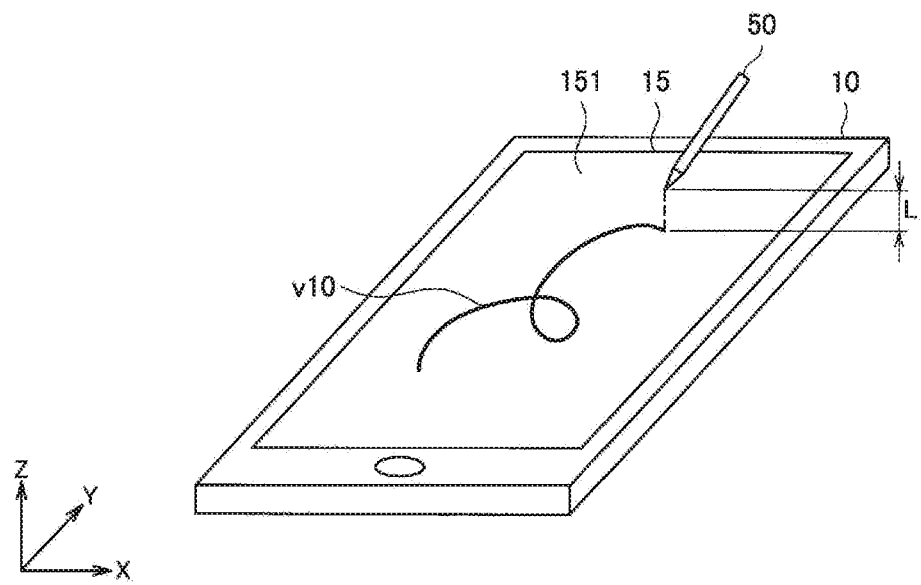
FIG. 1 is an explanatory diagram illustrating an overview of an information processing apparatus according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that the description will be given in the following order.
1. Overview
2. Functional configuration
3. Processing
4. Modified Example
   4.1. Modified Example 1
   4.2. Modified Example 2
5. Hardware configuration
6. Conclusion

1. OVERVIEW

First, with reference to FIG. 1, an information processing apparatus 10 according to an embodiment of the present disclosure will be described. FIG. 1 is an explanatory diagram illustrating an overview of the information processing apparatus 10 according to the present embodiment.

As shown in FIG. 1, the information processing apparatus 10 according to the present embodiment includes a display 15. The display 15 may be configured from, for example, a bistable display (for example, bistable electro-optical display) which is so-called electronic paper. Further, the display 15 is not limited to the bistable display, and may be configured from a liquid crystal display (LCD) or an organic light emitting diode (OLED) display, for example.

On the display 15, there is provided a device like a so-called touch panel, including a display surface of the display 15 serving as a detection plane 151, the device detecting contact and proximity of an operating object 50 such as a stick-shaped member including a stylus or a finger to a detection plane 151. Note that the detection plane 151 corresponds to an example of an "operation subject".

Note that if the display surface of the display 15 serves as the detection plane 151 and is capable of detecting the contact and the proximity of the operating object 50 to the detection plane 151, the mode of the device is not particularly limited. Specific example of the device capable of detecting the contact and the proximity of the operating object 50 includes a touch panel of an electrostatic capacity-type.

Further, as another example, a stylus pen of an electromagnetic induction-type may be employed as the operating object 50. In this case, electromagnetic waves are generated from a pen tip of the operating object 50, and the electromagnetic waves are detected by a sensor coil, which is provided underneath the detection plane 151. In this way, the contact and the proximity of the operating object to the detection plane 151 may be detected.

Further, as another example, an imaging unit is provided on the side of the operating object 50, an image of the detection plane 151 is captured by the imaging unit, and the captured image is analyzed. In this way, the contact and the proximity of the operating object 50 to the detection plane 151 may be detected.

According to the configuration described above, for example, a user can perform handwriting input to the information processing apparatus 10 by causing the operating object 50 to touch the detection plane 151 on the display 15.

In particular, the information processing apparatus 10 according to the present embodiment accepts user's handwriting input and draws (i.e., displays), as shown in FIG. 1, an image M1 representing a trajectory of a motion of the operating object 50 that touches the detection plane 151 on the display 15. In this way, the user can perform handwriting input in the same feeling as the case of writing letters and pictures on paper using writing tools such as a pen.

On the other hand, regarding a bistable display, with increase in a bit depth for displaying an image, the longer it takes for displaying the image on the display, and there are some cases in which a response to the handwriting input (i.e., display of the input information) is delayed. Note that, in the present description, the bit depth represents bit number for expressing gradation and chromaticity of an image. As a specific example, in the case where a binary black and white image is displayed, the bit depth for displaying the image is 2 bits. Further, as another example, in the case where the image is displayed in grayscale of 256 levels, the bit depth for displaying the image is 8 bits.

Taking into consideration the above-mentioned characteristics, among the apparatuses to which bistable displays are applied, there are some apparatuses in which responsiveness is improved by temporarily changing a display mode of the image displayed on the display, in the case where faster response is required as in the case of performing handwriting input.

Specifically, in the case of drawing a binary black and white image (i.e., in the case where the bit depth is 2 bits), the bistable display has a faster response in the change from white to black compared to the case of drawing an image in multi-gradation such as so-called grayscale (i.e., in the case where the bit depth is greater than 2 bits). Accordingly, in the information processing apparatus to which the bistable display is applied, the responsiveness at the time of performing handwriting input is improved by the following manner, for example, a binary black and white image is displayed on the display at the time of performing the handwriting input, and the image input after the completion of the handwriting input is redisplayed in the original bit depth.

However, in the case where the responsiveness is improved by temporarily changing display modes, processing of redisplaying the image in an original display mode (hereinafter, may be referred to as "redisplaying processing") and drawing processing based on user's handwriting input (hereinafter, may simply be referred to as "drawing processing") may compete with each other.

As a specific example, in the case where the redisplaying processing is executed at the time point when the operating object 50 is released from the detection plane 151, there may be a case where the user restarts handwriting input before the redisplaying processing is completed. In such a case, the redisplaying processing and the drawing processing compete with each other, and, for example, the drawing processing based on the handwriting input may be executed after the completion of the redisplaying processing which has been executed precedingly. In this case, the drawing processing accompanied with the handwriting input delays with respect to the user's handwriting input, and the delay may be revealed as deterioration in responsiveness at the time of performing the handwriting input.

To overcome the above problem, a conceivable method include delaying a time point at which the redisplaying processing starts with respect to the time point at which the operating object 50 is released from the detection plane 151, so that the frequency of executing the redisplaying processing is decreased. However, since it is difficult for the information processing apparatus to estimate the time point at which the user restarts the handwriting input (i.e., to estimate after how many seconds the user restarts the handwriting input), the competition between the redisplaying processing and the drawing processing is not necessarily prevented.

Accordingly, even if the operating object 50 is released from the detection plane 151 and the drawing processing accompanied with the handwriting input is stopped, the information processing apparatus 10 according to the present embodiment does not start the redisplaying processing of the image in the case where a distance L between the detection plane 151 and the operating object 50 is less than or equal to a threshold. Note that, in order to make the description easy to understand, the distance L between the detection plane 151 and the operating object 50 represents, as shown in FIG. 1, in the case where the detection plane 151 represents an xy-plane, a distance in a z-direction that is perpendicular to the xy-plane.

Then, in the case where the information processing apparatus 10 recognizes that the distance L between the detection plane 151 and the operating object 50 exceeds a threshold L0, the information processing apparatus 10 executes the redisplaying processing of the image (for example, processing of redisplaying a binary black and white image in multi-gradation such as grayscale).

Note that as long as the information processing apparatus 10 can directly or indirectly recognize that the distance L between the detection plane 151 and the operating object 50 exceeds the threshold L0, the method thereof is not particularly limited.

As a specific example, the information processing apparatus 10 can recognize the case in which neither the contact nor the proximity of the operating object 50 to the detection plane 151 is detected as the case in which the distance L between the detection plane 151 and the operating object 50 exceeds the threshold L0.

Further, as another example, the information processing apparatus 10 may directly calculate the distance L between the detection plane 151 and the operating object 50 on the basis of a result detected by the operating object 50 that comes close to the detection plane 151. As a specific example, in the case where a stylus pen of an electromagnetic induction-type is applied to a device for detecting the contact and the proximity of the operating object 50 to the detection plane 151, the information processing apparatus 10 may calculate the distance L on the basis of a magnetic flux density detected by a sensor coil. Further, in the case where a touch panel of an electrostatic capacity-type is applied, the information processing apparatus 10 may calculate the distance L on the basis of an amount of change in capacitance accompanied by approaching of the operating object 50. The information processing apparatus 10 calculates the distance L between the detection plane 151 and the operating object 50 as described above, and may also recognize that the distance L exceeds the threshold L0 by comparing the calculated distance L with the threshold L0.

In this way, the information processing apparatus 10 according to the present embodiment executes the drawing processing accompanied with the handwriting input and the processing of redisplaying the image on occasions different from each other on the basis of the detection result of the contact and the proximity of the operating object 50 to the detection plane 151.

That is, under the situation in which the user restarts the handwriting input after the execution of the redisplaying processing, the information processing apparatus 10 is capable of executing the redisplaying processing during a time period until which the user brings the operating object 50 into contact with the detection plane 151 (i.e., time period in which the user moves the operating object 50 up to the distance L0). Note that, although the threshold L0 differs depending on an expected utilization form of the information processing apparatus 10 and performances (what is called operation speed and display speed on the display 15) of the information processing apparatus 10, the threshold L0 may be set to approximately 1.0 [cm], as a specific example.

In this way, the information processing apparatus 10 according to the present embodiment can suppress the competition between the redisplaying processing and the drawing processing, and thus can prevent the deterioration in responsiveness at the time of performing the handwriting input accompanied with the competition. Accordingly, the information processing apparatus 10 according to the present embodiment will hereinafter be described in more detail.

2. FUNCTIONAL CONFIGURATION

Figure 2:
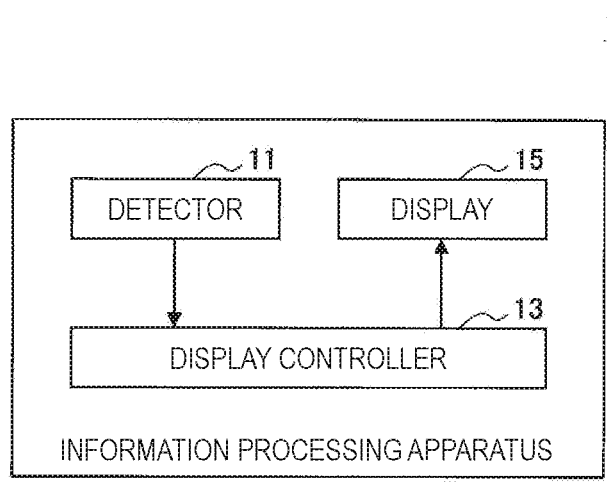
FIG. 2 is a block diagram showing an example of a functional configuration of the information processing apparatus according to the embodiment.

With reference to FIG. 2, an example of a functional configuration of the information processing apparatus 10 according to the present embodiment will be described. FIG. 2 is a block diagram showing an example of a functional configuration of the information processing apparatus 10 according to the present embodiment.

As shown in FIG. 2, the information processing apparatus 10 according to the present embodiment includes a detector 11, a display controller 13, and a display 15. Note that the display 15 corresponds to the display 15 described above with reference to FIG. 1.

The detector 11 detects contact and proximity of the operating object 50 to the detection plane 151, and successively outputs the detection result to the display controller 13 to be described later. In this event, in the case where detector 11 detects the contact or the proximity of the operating object 50 to the detection plane 151, the detector 11 outputs as the detection result, to the display controller 13, information indicating a position of the operating object 50 on the detection plane 151 which the operating object 50 touches or come close to.

The detector 11 may be configured from, for example, various types of sensors and circuits for controlling the sensors. Note that, as described above, the constituent element of the detector 11 is not limited as long as the detector 11 can detect the contact and the proximity of the operating object 50 to the detection plane 151. Of course, the constituent element of the detector 11 may be changed appropriately in accordance with the operating object 50 to be a detection target. As a specific example, in the case where a user's finger is the detection target, it is needless to say that a device capable of detecting the contact and the proximity of the user's finger to the detection plane 151 may be applied to the detector 11.

The display controller 13 successively acquires, from the detector 11, the detection result of the contact and the proximity of the operating object 50 to the detection plane 151. Note that, of the display controller 13, a constituent element that acquires the detection result from the detector 11 corresponds to an example of "acquisition unit".

Figure 3:
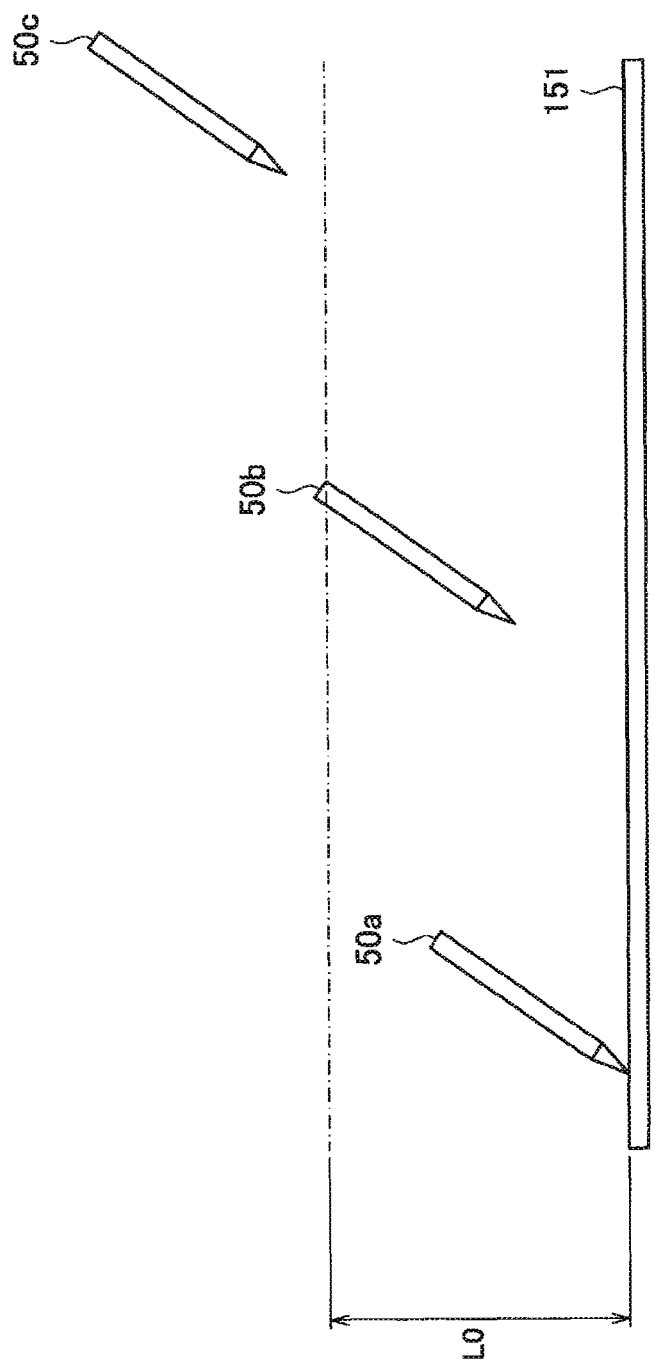
FIG. 3 is an explanatory diagram illustrating details of operations performed by a display controller according to the embodiment.

Then, the display controller 13 recognizes a state indicating a positional relationship between the detection plane 151 and the operating object 50 in accordance with the acquired detection result, and switches operations in accordance with the recognized state. Accordingly, with reference to FIG. 3, respective states to be occasions for the display controller 13 to switch operations and details of the operations performed by the display controller 13 corresponding to the states will hereinafter be described. FIG. 3 is an explanatory diagram illustrating details of operations performed by the display controller 13 according to the present embodiment.

FIG. 3 shows an example of relative positional relationships between the detection plane 151 and the operating object 50. In FIG. 3, a reference sign L0 schematically represents, as a distance based on the detection plane 151, a range in which the detector 11 is capable of detecting the operating object 50 in proximity to the detection plane 151 (hereinafter may be referred to as "detection range").

Further, in FIG. 3, a reference sign 50a represents a state in which the operating object 50 touches the detection plane 151. In this case, a detection result indicating that the operating object 50 touches the detection plane 151 is output from the detector 11 to the display controller 13.

In the case where the display controller 13 recognizes that the operating object 50 touches the detection plane 151 as shown in the state 50a, the display controller 13 executes the drawing processing based on user's handwriting input.

As a specific example, the display controller 13 recognizes a motion of the operating object 50 with respect to the detection plane 151 on the basis of information indicating the position at which the operating object 50 touches the detection plane 151, which the display controller 13 is successively notified of as the detection result from the detector 11. Then, the display controller 13 controls the display 15 such that a trajectory of a motion of the operating object 50 is drawn so as to follow the operating object 50, at a position on the display surface of the display 15 corresponding to the position at which the operating object 50 touches the detection plane 151.

Moreover, in this event, the display controller 13 controls the display 15 such that an image corresponding to user's handwriting input (for example, the trajectory of the motion of the operating object 50) is displayed in a display mode that is associated with the drawing processing in advance. As a specific example, in order to improve the responsiveness at the time of performing handwriting input, the display controller 13 controls the display 15 such that the image corresponding to the user's handwriting input is drawn in a binary black and white image.

Note that the processing described above is merely an example of the drawing processing, and the contents of the drawing processing is not necessarily limited to the processing of drawing the trajectory of the motion of the operating object 50 described above, as long as an image is drawn in accordance with the user's handwriting input.

Next, in FIG. 3, a state represented by a reference sign 50b will be described. The state 50b represents a state in which the detection plane 151 and the operating object 50 are spaced apart from each other and the operating object 50 is present within the detection range of the detector 11. In this case, the detector 11 outputs, to the display controller 13, a detection result indicating that the operating object 50 is in proximity to the detection plane 151.

In the case where the display controller 13 recognizes that the state has changed from the state 50a in which the operating object 50 touches the detection plane 151 to the state 50b in which the operating object 50 is in proximity to the detection plane 151, the display controller 13 stops execution of the drawing processing. Note that, the display controller 13 does not execute the redisplaying processing in this state. That is, at the time point at which the state is changed from the state 50a to the state 50b, the display 15 displays an image based on user's handwriting input in a display mode (for example, binary black and white image) associated with the drawing processing.

Next, in FIG. 3, a state represented by a reference sign 50c will be described. The state 50c represents a state in which the detection plane 151 and the operating object 50 are spaced apart from each other and the operating object 50 is present outside the detection range of the detector 11. In other words, the state 50c represents a state in which the detector 11 detects neither the contact nor the proximity of the operating object 50 to the detection plane 151. Moreover, in the example shown in FIG. 3, the state 50c corresponds to the state in which the distance L between the detection plane 151 and the operating object 50 exceeds the threshold L0, and the threshold L0 is determined on the basis of the range in which the detector 11 is capable of detecting the proximity of the operating object 50 to the detection plane 151.

In the case where the display controller 13 recognizes that the state has changed from the state 50b in which the operating object 50 is in proximity to the detection plane 151 to the state 50c in which the operating object 50 is separated away outside the detection range of the detector 11, and in the case where an image is displayed on the display 15, the display controller 13 executes the redisplaying processing. As a specific example, the display controller 13 controls the display 15 such that the image displayed on the display 15 on the basis of user's handwriting input and displayed in a binary black and white image as a display mode at the time of performing the drawing processing is redisplayed in multi-gradation such as grayscale (i.e., in a bit depth greater than the bit depth at the time of performing the drawing processing), for example.

Further, in this event, the display controller 13 may subject the image based on the user's handwriting input to image processing such as antialiasing (so-called smoothing processing), and may display the image after the image processing on the display 15.

Note that the processing described above is merely an example of the redisplaying processing, and the contents of the redisplaying processing is not necessarily limited to the above as long as an image is redisplayed in a display mode that is different from the display mode at the time of performing the drawing processing.

As a specific example, as the control on the bit depth described above, the display controller 13 may control chromaticity, and the control is not only limited to gradation.

Further, as another example, also at the time of performing the drawing processing, the display controller 13 may display the image based on the handwriting input in multi-gradation on the display 15, and may execute only image processing such as antialiasing as the redisplaying processing.

In this way, "displaying (redisplaying) an image in a different display mode" in the present description may include not only the control on gradation and chromaticity like the control on the bit depth, but may also include the control to display (redisplay) an image in a different mode by subjecting the image to so-called image processing.

Further, if it is possible to temporarily improve the responsiveness at the time of performing the drawing processing, it is needless to say that the contents of the redisplaying processing (that is, how to control the display mode) may be changed appropriately in accordance with characteristics of a device to be applied to the display 15.

Moreover, in the case where the state is changed again to the state 50a in which the operating object 50 touches the detection plane 151, the display controller 13 starts the drawing processing again, and accepts user's handwriting input.

Heretofore, with reference to FIGS. 2 and 3, an example of the functional configuration of the information processing apparatus 10 according to the present embodiment has been described. In the above, an example has been described in which a sheet-like structure like the detection plane 151 is used as the operation subject of the motion of the operating object 50, and the drawing processing and the redisplaying processing are controlled on the basis of the distance L between the operation subject and the operating object 50. However, as long as the drawing processing and the redisplaying processing can be executed at occasions different from each other on the basis of the distance L from the operating object 50, it is needless to say that the structure of the operation subject is not necessarily limited to the sheet-like structure.

3. PROCESSING

Figure 4:
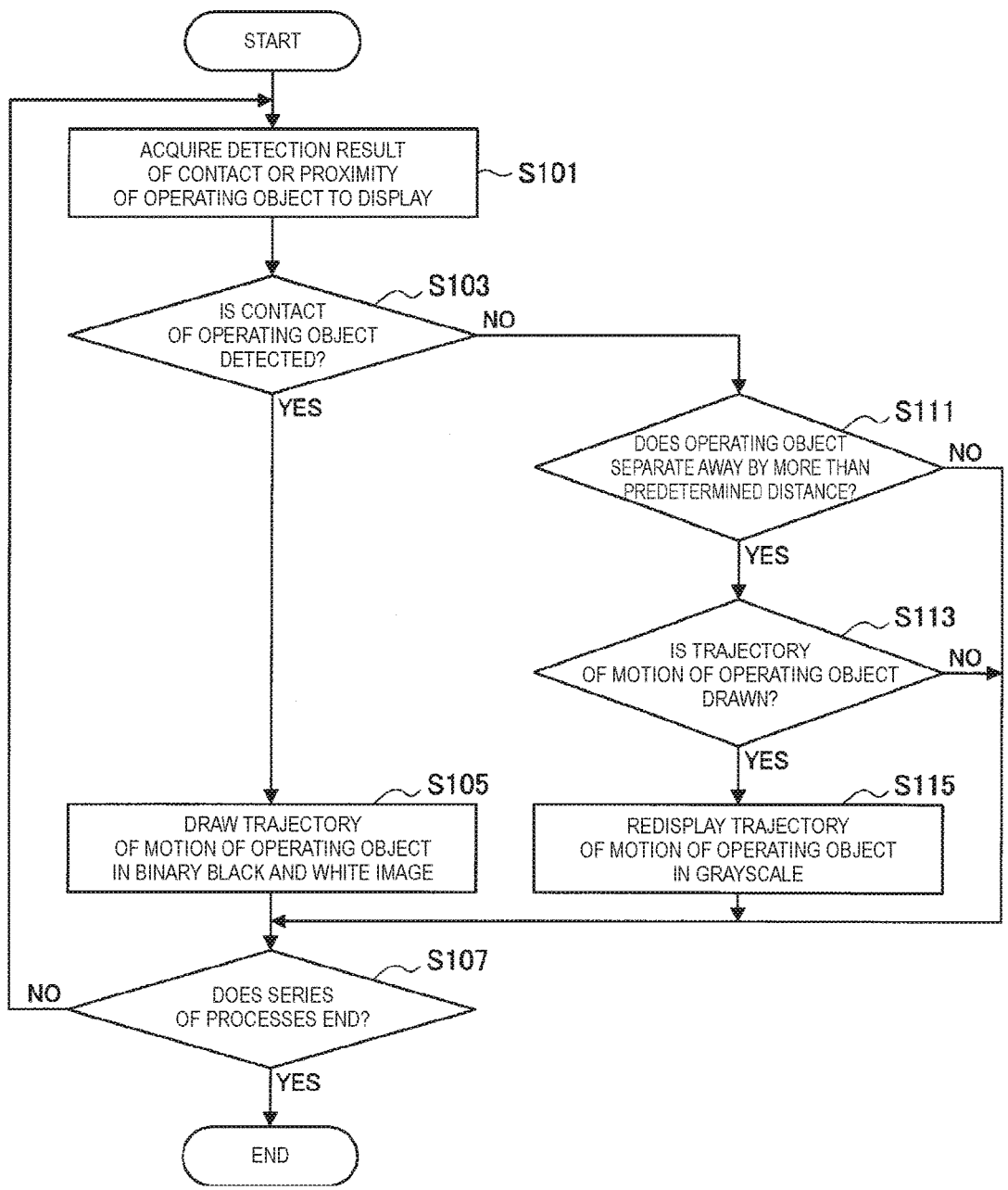
FIG. 4 is a flowchart showing an example of a flow of a series of operations performed by the information processing apparatus according to the embodiment.

Next, with reference to FIG. 4, an example of a flow of a series of operations performed by the information processing apparatus 10 according to the present embodiment will be described. FIG. 4 is a flowchart showing an example of a flow of a series of operations performed by the information processing apparatus 10 according to the present embodiment.

(Step S101)

The detector 11 detects contact and proximity of the operating object 50 to the detection plane 151, and successively outputs the detection result to the display controller 13. Further, in this event, in the case where the detector 11 detects the contact or the proximity of the operating object 50 to the detection plane 151, the detector 11 outputs to the display controller 13 as the detection result information indicating a position on the detection plane 151 which the operating object 50 touches or comes close to.

The display controller 13 successively acquires, from the detector 11, the detection result of the contact and the proximity of the operating object 50 to the detection plane 151.

(Steps S103 and S105)

In the case where the display controller 13 recognizes that the operating object 50 touches the detection plane 151 on the basis of the acquired detection result (YES in Step S103), the display controller 13 executes the drawing processing based on user's handwriting input (Step S105).

In this event, the display controller 13 controls the display 15 such that an image corresponding to the user's handwriting input (for example, a trajectory of a motion of the operating object 50) is displayed in a display mode that is associated with the drawing processing in advance. As a specific example, in order to improve the responsiveness at the time of performing handwriting input, the display controller 13 controls the display 15 such that the image corresponding to the user's handwriting input is drawn in a binary black and white image.

(Steps S103 and S111)

Moreover, in the case where the display controller 13 no longer detects the contact of the operating object 50 to the detection plane 151 (NO in Step S103) and recognizes that the state has changed to the state in which the operating object 50 is in proximity to the detection plane 151 (NO in Step S111), the display controller 13 stops the execution of the drawing processing. Note that, in this state, the display controller 13 does not execute the redisplaying processing. That is, at the time point at which the state is changed from the state in which the operating object 50 touches the detection plane 151 to the state in which the operating object 50 is in proximity to the detection plane 151, the display 15 displays an image based on user's handwriting input in a display mode (for example, binary black and white image) associated with the drawing processing.

(Steps S111 and S113)

Further, in the case where the display controller 13 recognizes that, after the state in which the operating object 50 is in proximity to the detection plane 151, the operating object 50 is separated away from the detection plane 151 and the distance therebetween exceeds a predetermined distance L0 (YES in Step S111), the display controller 13 confirms whether an image (for example, a trajectory of a motion of the operating object 50) is displayed on the display 15. Note that, the case where the operating object 50 is separated away from the detection plane 151 and the distance therebetween exceeds the predetermined distance L0 corresponds to the case where, for example, the case where the operating object 50 moves outside the detection range of the detector 11.

(Steps S113 and S115)

In the case where the image is displayed on the display 15 (YES in Step S113), the display controller 13 executes the redisplaying processing (Step S115). As a specific example, the display controller 13 controls the display 15 such that the image displayed on the display 15 on the basis of user's handwriting input and displayed in a binary black and white image as a display mode at the time of performing the drawing processing is redisplayed in multi-gradation such as grayscale (i.e., in a bit depth greater than the bit depth at the time of performing the drawing processing), for example.

Note that, in the case where no image is displayed on the display 15 (NO in Step S113), the display controller 13 does not necessarily execute the redisplaying processing.

(Step S107)

The display controller 13 executes the above processes until the user issues an instruction to end the series of processes (for example, instruction to turn off the power) (NO in Step S107). Then, the display controller 13 ends the series of the above-mentioned processes on the basis of the end instruction (Step S107, YES).

Heretofore, with reference to FIG. 4, a flow of a series of operations performed by the information processing apparatus 10 according to the present embodiment has been described.

4. MODIFIED EXAMPLE

4.1. Modified Example 1

Next, an information processing apparatus 10 according to Modified Example 1 of the present embodiment will be described. In the embodiment described above, as shown in FIG. 3, the display controller 13 stops the drawing processing at the time point at which the operating object 50 is separated away from the detection plane 151, and executes the redisplaying processing at the time point at which the operating object 50 is separated away outside the detection range of the detector 11. On the other hand, as long as the drawing processing and the redisplaying processing are executed at occasions different from each other on the basis of the distance L between the detection plane 151 and the operating object 50, it is not limited to the method described on the basis of FIG. 3.

Figure 5:
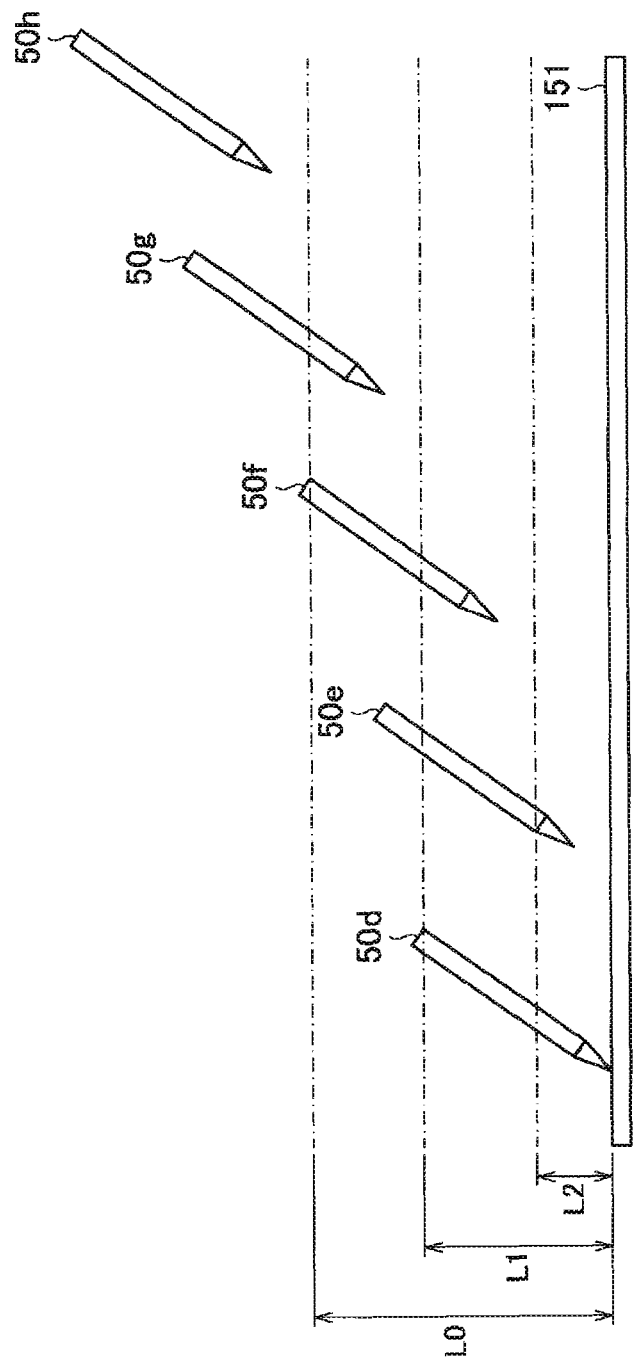
FIG. 5 is an explanatory diagram illustrating an example of operations performed by a display controller according to Modified Example 1 of the embodiment.

Accordingly, with reference to FIG. 5, examples of occasions for controlling the drawing processing and the redisplaying processing depending on the distance L between the detection plane 151 and the operating object 50 will hereinafter be described by focusing on operation of the display controller 13. FIG. 5 is an explanatory diagram illustrating an example of operations performed by the display controller 13 according to Modified Example 1 of the embodiment.

FIG. 5 shows an example of relative positional relationships between the detection plane 151 and the operating object 50. In FIG. 5, a reference sign L0 schematically represents a range in which the detector 11 is capable of detecting the operating object 50 in proximity to the detection plane 151, that is, the detection range of the detector 11 as a distance based on the detection plane 151. Further, reference signs L1 and L2 each represent a distance based on the detection plane 151 within the detection range L0 of the detector 11, and satisfy a relationship of L0>L1>L2.

Further, in FIG. 5, a reference sign 50d represents a state in which the operating object 50 touches the detection plane 151. Further, a reference sign 50h represents a state in which the detection plane 151 and the operating object 50 are spaced apart from each other and the operating object 50 is present outside the detection range of the detector 11. In other words, the state 50h represents a state in which the detector 11 detects neither the contact nor the proximity of the operating object 50 to the detection plane 151.

Still further, reference signs 50e to 50g each represent a state in which the detection plane 151 and the operating object 50 are spaced apart from each other and the operating object 50 is present inside the detection range of the detector 11. To be specific, the state 50e schematically represents the case where the distance L between the detection plane 151 and the operating object 50 satisfies 0<L≤L1. In the same manner, the state 50f represents the case where the distance L between the detection plane 151 and the operating object 50 satisfies L1<L≤L2, and the state 50g represents the case where the distance L between the detection plane 151 and the operating object 50 satisfies L2<L≤L0.

In the case where the display controller 13 according to Modified Example 1 recognizes that, as shown in the states 50d and 50e, the operating object 50 touches the detection plane 151 or that the distance L between the detection plane 151 and the operating object 50 is less than or equal to the threshold L1, the display controller 13 executes the drawing processing.

Further, in the case where the display controller 13 recognizes that the state has changed from the state in which the distance L between the detection plane 151 and the operating object 50 satisfies L≤L1, that is, the state 50d or 50e, to the state 50f in which the distance L satisfies L1<L≤L2, the display controller 13 stops execution of the drawing processing. Note that, the display controller 13 does not execute the redisplaying processing in this state. That is, at the time point at which the state is changed from the state 50e to the state 50f, the display 15 displays an image based on user's handwriting input in a display mode (for example, binary black and white image) associated with the drawing processing.

Still further, in the case where the display controller 13 recognizes that the state has changed from the state 50f in which the distance L between the detection plane 151 and the operating object 50 satisfies L1<L≤L2 to the state in which the distance L satisfies L2<L, that is, the state 50g or 50h, and in the case where an image is displayed on the display 15, the display controller 13 executes the redisplaying processing. As a specific example, the display controller 13 controls the display 15 such that the image displayed on the display 15 on the basis of user's handwriting input and displayed in a binary black and white image as a display mode at the time of performing the drawing processing is redisplayed in multi-gradation such as grayscale (i.e., in a bit depth greater than the bit depth at the time of performing the drawing processing), for example.

Moreover, in the case where the state is changed again to the state 50d or 50e, the display controller 13 starts the drawing processing again, and accepts user's handwriting input.

Heretofore, with reference to FIG. 5, examples of occasions for controlling the drawing processing and the redisplaying processing depending on the distance L between the detection plane 151 and the operating object 50 have been described as Modified Example 1. In this way, as long as the distance L between the detection plane 151 and the operating object 50 is directly or indirectly recognized and the drawing processing and the redisplaying processing are executed at occasions different from each other on the basis of the detected distance L, the method thereof is not particularly limited.

4.2. Modified Example 2

Next, an information processing apparatus 10 according to Modified Example 2 of the present embodiment will be described. In the embodiment described above, as shown in FIGS. 1 and 2, the example has been described in which the detector 11, the display controller 13, and the display 15 are provided in an integrated manner as the information processing apparatus 10. On the other hand, the detector 11, the display controller 13, and the display 15 are not necessarily provided in an integrated manner, and the positions to which the respective components are provided are not particularly limited as long as the respective components can perform the above-mentioned operations.

Figure 6:
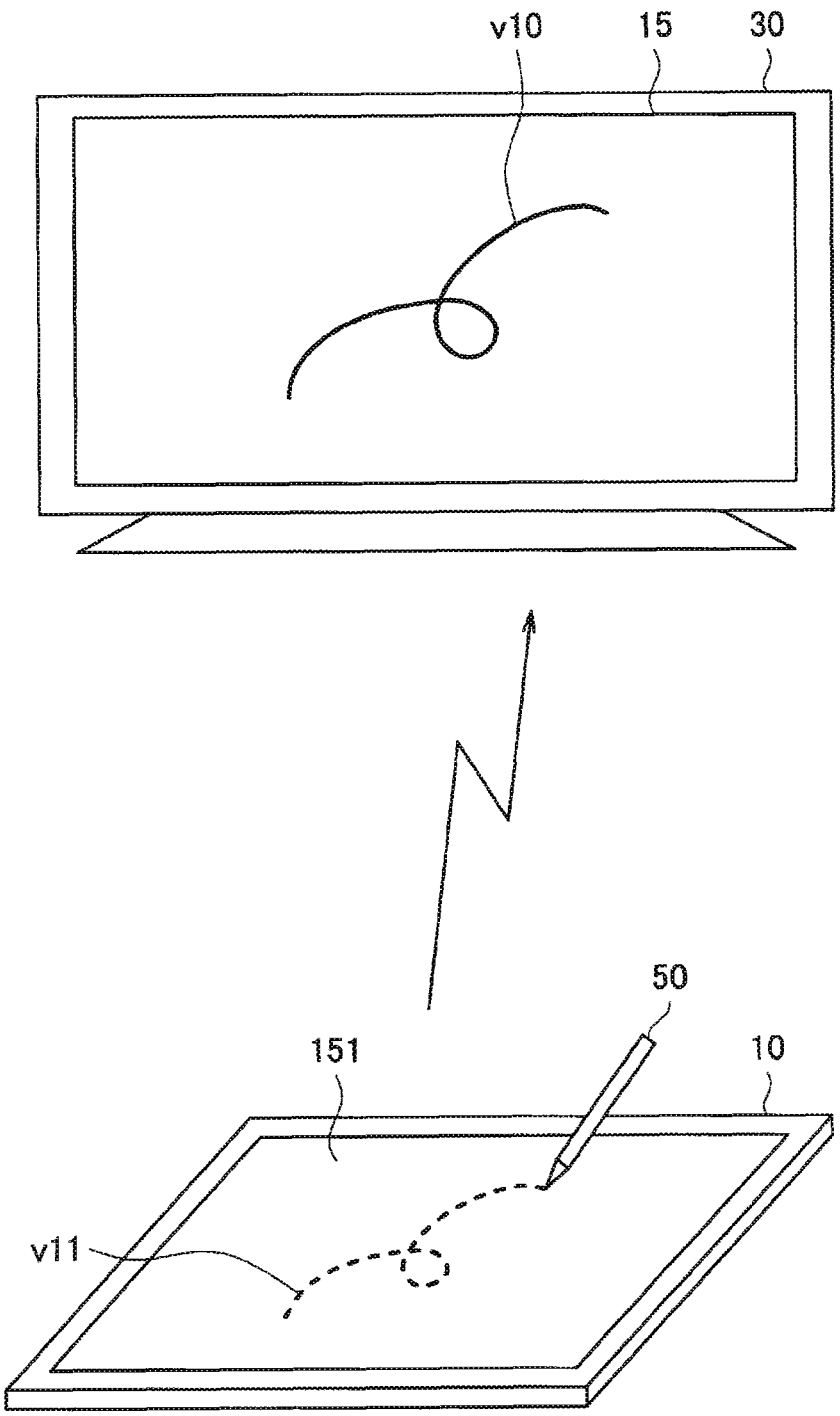
FIG. 6 is an explanatory diagram illustrating an example of a configuration of an information processing apparatus according to Modified Example 2 of the embodiment.

For example, FIG. 6 is an explanatory diagram illustrating an example of a configuration of the information processing apparatus 10 according to Modified Example 2 of the present embodiment, and shows an example of the case where the display 15 is provided on a display device 30, which is different from the information processing apparatus 10 and which is an external device. That is, the example shown in FIG. 6 corresponds to the case in which the detector 11 and the display controller 13 are provided on the information processing apparatus 10, and the display 15 is provided on display device 30. In other words, the example shown in FIG. 6 represents the information processing apparatus 10 configured as a device like a so-called pen tablet, which is capable of accepting handwriting input, and shows an example of the case of causing the external display device 30 to display an image v10 based on handwriting input v11.

In the example shown in FIG. 6, for example, the information processing apparatus 10 and the display device 30 may be configured to be communicable to each other through a predetermined network n1. In this case, the display controller 13 provided on the information processing apparatus 10 may control the operation of the display 15 provided on the display device 30 through the network n1.

Heretofore, with reference to FIG. 6, an example of the configuration of the information processing apparatus 10 according to Modified Example 2 of the present embodiment has been described. Note that the configuration described above is merely an example, and it is needless to say that, for example, the detector 11, the display controller 13, and the display 15 are provided on different apparatuses.

5. HARDWARE CONFIGURATION

Figure 7:
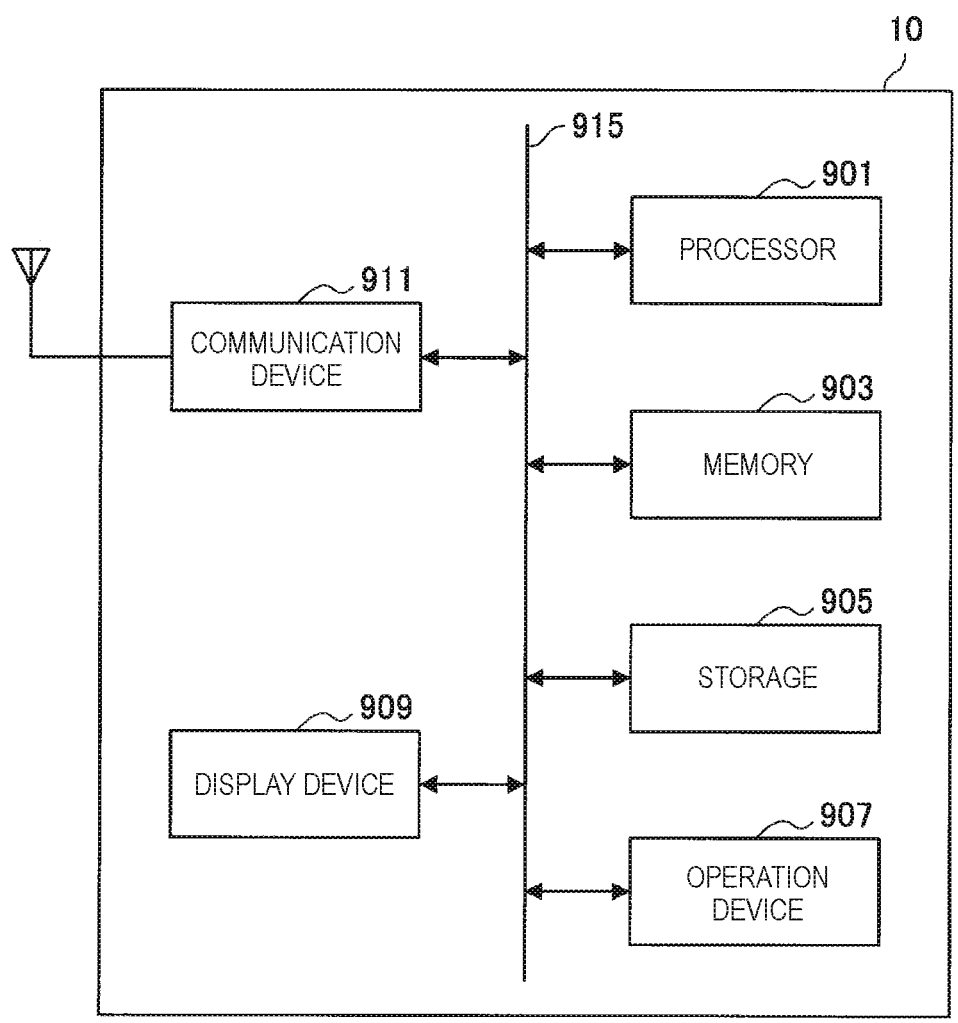
FIG. 7 is an explanatory diagram illustrating an example of a hardware configuration of the information processing apparatus according to the embodiment.

Next, with reference to FIG. 7, an example of a hardware configuration of the information processing apparatus 10 according to each embodiment of the present disclosure will be described. FIG. 7 is an explanatory diagram illustrating an example of a hardware configuration of the information processing apparatus 10 according to each embodiment of the present disclosure.

As shown in FIG. 7, the information processing apparatus 10 according to the present embodiment includes a processor 901, memory 903, a storage 905, an operation device 907, a display device 909, a communication device 911, and a bus 915.

The processor 901 may be, for example, a central processing unit (CPU), a graphics processing unit (GPU), a digital signal processor (DSP), or a system on chip (SoC), and executes various types of processing of the information processing apparatus 10. The processor 901 may be configured from an electronic circuit for executing various types of arithmetic processing. Note that the display controller 13 described above may be achieved by the processor 901.

The memory 903 includes random access memory (RAM) and read only memory (ROM), and stores programs and data to be executed by the processor 901. The storage 905 may include a storage medium such as semiconductor memory or a hard disk.

The operation device 907 has a function of generating an input signal for a user to perform a desired operation. For example, the operation device 907 may include an input unit used for the user to input information, such as a touch panel, a button, and a switch, and an input control circuit for generating an input signal on the basis of the user's input and supplies the processor 901 with the input signal. Note that the detector 11 described above may be configured as a part (for example, input control circuit) of the operation device 907. Further, the operation device 907 may also include various types of sensors for detecting user's operation, such as contact or proximity of an operating object to an operation subject.

The display device 909 is an example of an output device, and is a bistable display (for example, bistable electro-optical display) called so-called electronic paper, for example. Further, the display device 909 is not limited to the bistable display, and may be a device such as a liquid crystal display (LCD) device and an organic light emitting diode (OLED) display. The display device 909 is capable of notifying the user of predetermined information by displaying a screen. For example, the display 15 described above may be achieved by the display device 909.

The communication device 911 is communication means included in the information processing apparatus 10, and communicates with an external device through a network. The communication device 911 is a wired or wireless communication interface. In the case where the communication device 911 is configured as a wireless communication interface, the communication device 911 may include a communication antenna, a radio frequency (RF) circuit, a baseband processor, and the like.

The communication device 911 has a function of performing various types of signal processing on a signal received from the external device, and is capable of supplying the processor 901 with a digital signal that is generated from the received analog signal.

The bus 915 connects the processor 901, the memory 903, the storage 905, the operation device 907, the display device 909, and the communication device 911 with one another. The bus 915 may include a plurality of buses.

Further, it is also possible to create a program for causing hardware such as a processor, memory, and a storage, which are built in a computer, to exhibit substantially the same functions as the respective functions of the information processing apparatus 10 described above. Further, there is also provided a computer-readable storage medium having the program recorded therein.

6. CONCLUSION

Heretofore, as described above, even if the operating object 50 is separated away from the detection plane 151 and the drawing processing accompanied with the handwriting input is stopped, the information processing apparatus 10 according to the present embodiment does not start the redisplaying processing of the image in the case where the distance L between the detection plane 151 and the operating object 50 is less than or equal to the threshold L0. Then, in the case where the information processing apparatus 10 recognizes that the distance L between the detection plane 151 and the operating object 50 exceeds the threshold L0, the information processing apparatus 10 executes the redisplaying processing of the image (for example, processing of redisplaying a binary black and white image in multi-gradation such as grayscale).

In this way, the information processing apparatus 10 according to the present embodiment executes the drawing processing accompanied with the handwriting input and the processing of redisplaying the image on occasions different from each other on the basis of the detection result of the contact and the proximity of the operating object 50 to the detection plane 151.

That is, under the situation in which the user restarts the handwriting input after the execution of the redisplaying processing, the information processing apparatus 10 is capable of executing the redisplaying processing during a time period until which the user brings the operating object 50 into contact with the detection plane 151 (i.e., time period in which the user moves the operating object 50 up to the distance L0).

In this way, the information processing apparatus 10 according to the present embodiment can suppress occurrence of the competition between the redisplaying processing and the drawing processing, and thus can prevent the deterioration in responsiveness at the time of performing the handwriting input accompanied with the competition.

Note that, it is needless to say that the device that configures the display 15 is not necessarily limited to the bistable display as long as the display controller 13 is capable of controlling the operation thereof (that is, capable of controlling the display mode of the displayed image).

Further, with increase in the threshold L0, a time period until which the user brings the operating object 50 into contact with the detection plane 151 (i.e., time period in which the user moves the operating object 50 up to the distance L0) after execution of the redisplaying processing tends to get longer. Accordingly, it is needless to say that the threshold L0 is determined in advance in accordance with a response speed of a display applied to the display 15 and a processing speed (processing performance) of the information processing apparatus 10, and on the basis of preparatory experiments and the like, and the determined threshold L0 may be set to the information processing apparatus 10.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing apparatus including:

an acquisition unit configured to acquire a detection result from a detector that detects proximity of an operating object to an operation subject; and a display controller configured to, in a case where the display controller recognizes that a distance between the operation subject and the operating object, which are spaced apart from each other, exceeds a threshold on the basis of the detection result, cause a display to display an image in a display mode different from a display mode used in a case where the distance is less than or equal to the threshold.

(2)

The information processing apparatus according to (1), wherein, in a case where the display controller recognizes that the distance exceeds the threshold, the display controller causes the display to display the image in a bit depth different from a bit depth used in a case where the distance is less than or equal to the threshold.

(3)

The information processing apparatus according to (2), wherein, on a basis of a time point at which the distance exceeds the threshold, the display controller causes the display to redisplay the image, which has been displayed in a first bit depth, in a second bit depth that is different from the first bit depth.

(4)

The information processing apparatus according to (3), wherein the second bit depth is greater than the first bit depth.

(5)

The information processing apparatus according to (3) or (4), wherein the first bit depth is a bit depth of 2 bits.

(6)

The information processing apparatus according to (1), wherein, in a case where the display controller recognizes that the distance exceeds the threshold, the display controller causes the display to display an image on which predetermined image processing is performed, with respect to the image displayed on the display in a case where the distance is less than or equal to the threshold.

(7)

The information processing apparatus according to any one of (1) to (6), wherein, in a case where the proximity of the operating object to the operation subject is not detected, the display controller recognizes that the distance exceeds the threshold.

(8)

The information processing apparatus according to any one of (1) to (7), wherein, in a case where the display controller recognizes that the distance between the operation subject and the operating object is less than or equal to another threshold, the another threshold being less than the threshold, the display controller controls drawing of the image.

(9)

The information processing apparatus according to (8), wherein the acquisition unit acquires contact or proximity of the operating object to the operation subject as the detection result from the detector, and in a case where the display controller recognizes that the operating object is in contact with the operation subject, the display controller controls the drawing of the image.

(10)

The information processing apparatus according to (8) or (9), wherein the acquisition unit acquires a trajectory of a motion of the operating object with respect to the operation subject in a case where the distance between the operation subject and the operating object is less than or equal to the another threshold, and the display controller controls the drawing of the image showing the trajectory.

(11)

The information processing apparatus according to any one of (1) to (10), wherein the information processing apparatus includes the detector.

(12)

The information processing apparatus according to any one of (1) to (11), wherein the information processing apparatus includes the display.

(13)

The information processing apparatus according to (12), wherein the display is a bistable display.

(14)

An information processing apparatus including:

acquiring a detection result from a detector that detects proximity of an operating object to an operation subject; and causing, by a processor, in a case where the display controller recognizes that a distance between the operation subject and the operating object, which are spaced apart from each other, exceeds a threshold on the basis of the detection result, a display to display an image in a display mode different from a display mode used in a case where the distance is less than or equal to the threshold.

(15)

A program for causing a computer to execute:

acquiring a detection result from a detector that detects proximity of an operating object to an operation subject; and causing, in a case where the display controller recognizes that a distance between the operation subject and the operating object, which are spaced apart from each other, exceeds a threshold on the basis of the detection result, a display to display an image in a display mode different from a display mode used in a case where the distance is less than or equal to the threshold.

REFERENCE SIGNS LIST 10 information processing apparatus
11 detector
13 display controller
15 display
151 detection plane
50 operating object

The invention claimed is:

1. An information processing apparatus comprising:
an acquisition unit configured to acquire a detection result from a detector that detects proximity of an operating object to an operation subject; and
a display controller configured to, in a case where the display controller recognizes that a distance between the operation subject and the operating object, which are spaced apart from each other, exceeds a threshold on the basis of the detection result, cause a display to display an image in a display mode different from a display mode used in a case where the distance is less than or equal to the threshold, wherein, in a case where the display controller recognizes that the distance exceeds the threshold, the display controller causes the display to display the image in a bit depth different from a bit depth used in a case where the distance is less than or equal to the threshold.

2. The information processing apparatus according to claim 1, wherein, on a basis of a time point at which the distance exceeds the threshold, the display controller causes the display to redisplay the image, which has been displayed in a first bit depth, in a second bit depth that is different from the first bit depth.

3. The information processing apparatus according to claim 2, wherein the second bit depth is greater than the first bit depth.

4. The information processing apparatus according to claim 2, wherein the first bit depth is a bit depth of 2 bits.

5. The information processing apparatus according to claim 1, wherein, in a case where the display controller recognizes that the distance exceeds the threshold, the display controller causes the display to display an image with respect to the image displayed on the display in a case where the distance is less than or equal to the threshold.

6. The information processing apparatus according to claim 1, wherein, in a case where the proximity of the operating object to the operation subject is not detected, the display controller recognizes that the distance exceeds the threshold.

7. The information processing apparatus according to claim 1, wherein, in a case where the display controller recognizes that the distance between the operation subject and the operating object is less than or equal to another threshold, the another threshold being less than the threshold, the display controller controls drawing of the image.

8. The information processing apparatus according to claim 7, wherein the acquisition unit acquires contact or proximity of the operating object to the operation subject as the detection result from the detector, and
in a case where the display controller recognizes that the operating object is in contact with the operation subject, the display controller controls the drawing of the image.

9. The information processing apparatus according to claim 7, wherein the acquisition unit acquires a trajectory of a motion of the operating object with respect to the operation subject in a case where the distance between the operation subject and the operating object is less than or equal to the another threshold, and
the display controller controls the drawing of the image showing the trajectory.

10. The information processing apparatus according to claim 1, wherein the information processing apparatus includes the detector.

11. The information processing apparatus according to claim 1, wherein the information processing apparatus includes the display.

12. The information processing apparatus according to claim 11, wherein the display is a bistable display.

13. An information processing method comprising:
acquiring a detection result from a detector that detects proximity of an operating object to an operation subject; and
causing, by a processor, in a case where the display controller recognizes that a distance between the operation subject and the operating object, which are spaced apart from each other, exceeds a threshold on the basis of the detection result, a display to display an image in a display mode different from a display mode used in a case where the distance is less than or equal to the threshold, wherein, in a case where the display controller recognizes that the distance exceeds the threshold, the display controller causes the display to display the image in a bit depth different from a bit depth used in a case where the distance is less than or equal to the threshold.

14. A non-transitory storage medium storing a program for causing a computer to execute:
acquiring a detection result from a detector that detects proximity of an operating object to an operation subject; and
causing, in a case where the display controller recognizes that a distance between the operation subject and the operating object, which are spaced apart from each other, exceeds a threshold on the basis of the detection result, a display to display an image in a display mode different from a display mode used in a case where the distance is less than or equal to the threshold, wherein, in a case where the display controller recognizes that the distance exceeds the threshold, the display controller causes the display to display the image in a bit depth different from a bit depth used in a case where the distance is less than or equal to the threshold.

* * * * *